United States Patent [19]

Burns et al.

[11] Patent Number: 5,617,223
[45] Date of Patent: Apr. 1, 1997

[54] IMAGE SCANNER SYSTEM AND METHOD FOR IMPROVED MICROFILM IMAGE QUALITY

[75] Inventors: Peter D. Burns; John E. Redden, both of Rochester, N.Y.

[73] Assignee: Eastman Kodak Company, Rochester, N.Y.

[21] Appl. No.: 496,276

[22] Filed: Jun. 28, 1995

Related U.S. Application Data

[63] Continuation of Ser. No. 843,675, Feb. 28, 1992, abandoned.
[51] Int. Cl.⁶ .................................................. H04N 1/46
[52] U.S. Cl. ......................... 358/527; 358/504; 358/522
[58] Field of Search .................................. 358/521–523, 358/527, 531, 532, 471, 474, 466, 467, 447, 487, 504; 382/168–169, 171–172; H04N 1/04, 1/46

[56] References Cited

U.S. PATENT DOCUMENTS

| | | | |
|---|---|---|---|
| 4,636,845 | 1/1987 | Alkofer | 358/447 |
| 4,642,683 | 2/1987 | Alkofer | 358/447 |
| 4,774,569 | 9/1988 | Morton | 358/102 |
| 4,903,145 | 2/1990 | Funada | 358/462 |
| 4,977,521 | 11/1990 | Kaplan | 382/17 |
| 5,042,077 | 8/1991 | Burke | 382/51 |
| 5,081,529 | 1/1992 | Collette | 358/527 |
| 5,121,195 | 6/1992 | Seki et al. | 358/80 |
| 5,133,022 | 7/1992 | Weideman | 358/447 |
| 5,140,649 | 8/1992 | Kageyama | 382/18 |
| 5,255,085 | 10/1993 | Spence | 358/527 |

FOREIGN PATENT DOCUMENTS

| | | |
|---|---|---|
| 0258740A3 | 8/1987 | European Pat. Off. |
| 0442054A3 | 11/1990 | European Pat. Off. |
| WO91/12540 | 8/1991 | WIPO |

*Primary Examiner*—Kim Vu
*Attorney, Agent, or Firm*—Thomas H. Close

[57] ABSTRACT

In a digital image scanning system and method, a sample of tone values from the image is used to estimate the exposure or central tendency of the recorded image. The estimate is then used to select a tone correction function used to process the image prior to printing, transmission, or CRT display.

2 Claims, 1 Drawing Sheet

IMAGE SCANNER SYSTEM AND METHOD FOR IMPROVED MICROFILM IMAGE QUALITY

This is a Continuation of application Ser. No. 843,675, filed 28 Feb., 1992, now abandoned.

TECHNICAL FIELD

The present invention relates to image processing and, more particularly, to a digital image scanner system and method for improving the image quality of microfilm.

BACKGROUND ART

Microfilm retrieval systems are used to display and print documents that have previously been recorded on microfilm. Although manufacturers recommend conditions for exposure and chemical processing of the film images, wide variations in these can occur in practice. This leads to variations in the contrast and optical density or opacity among documents recorded on microfilm.

Recently, electronic systems have been developed that include a digital scanner, image processing hardware and software, and electronic printer or CRT display. These systems typically scan the film image and encode the light and dark image information in, for example, two, four, sixteen, or up to 256 levels. Since the designer and user of the electronic retrieval equipment have no control over the contrast and density of the film to be scanned, some way must be used to ensure that the important image information is properly captured, stored and processed so that the document information is rendered correctly on a display or print.

Enhancement of an image based on the shape of its histogram can be accomplished by a histogram equalization method. The cumulative distribution function can be calculated and used to transform the original image. Image statistics based on the histogram of the image values have also been used to compute a tone reproduction function, as described in U.S. Pat. No. 4,642,683. The '683 patent discloses a method to improve the appearance of natural scene images that exhibit a bimodal tone value distribution due to back-lit, or close-up flash film exposure. A histogram of sample tone values is generated and statistical tests for the presence of a bimodal distribution is performed.

In U.S. Pat. No. 4,636,845, a method for processing photographic images that have been over or under exposed is described. This method uses a normalized histogram and performs a test of skewness. If the computed skewness exceeds a predetermined amount, the image contrast, or tone values, are adjusted by an amount equal to the value of a standard variate computed for the sample at the mode of the tone values of the sample. This is done using a tone reproduction function that is again scene-specific.

These existing techniques yield good results for natural scenes where the distribution functions of the important information can be assumed to be a standard normal, or the sum of standard normal distributions. For document images, however, these transformations which are unique for each image yield inconsistent results. This is particularly true if the digital image information has been corrupted due to an intermediate step involving, for example, optical lenses or microfilm granularity noise.

It is seen then that there exists a need for an image scanner system which can effectively transform document images from microfilm.

SUMMARY OF THE INVENTION

This need is met by the digital image processing system and method according to the present invention, wherein a sample of tone values from the image is used to estimate the exposure or central tendency of the recorded image. The estimate is then used to select a tone correction function used to process the image prior to printing, transmission, or CRT display.

In accordance with one aspect of the present invention, an image scanner system comprises a microfilm transport system for locating a desired image in a film gate and a lamp for projecting the desired image through the film gate and into projection optics. A receiving device receives the projected desired image and generates electronic image data in response thereto. The image scanner system further comprises image processing and tone correction means for processing the electronic image data and generating an output image. Finally, the image scanner system comprises an output device for outputting the output image.

Accordingly, it is an object of the present invention to provide improved document reproduction for microfilm. It is an advantage of the present invention that it provides a stable, easy to implement, method of automatic image analysis and tone correction. It is a further advantage that the present invention is flexible and inexpensive.

Other objects and advantages of the invention will be apparent from the following description, the accompanying drawings and the appended claims.

DETAILED DESCRIPTION OF THE PREFERRED EMBODIMENTS

Figure 1:
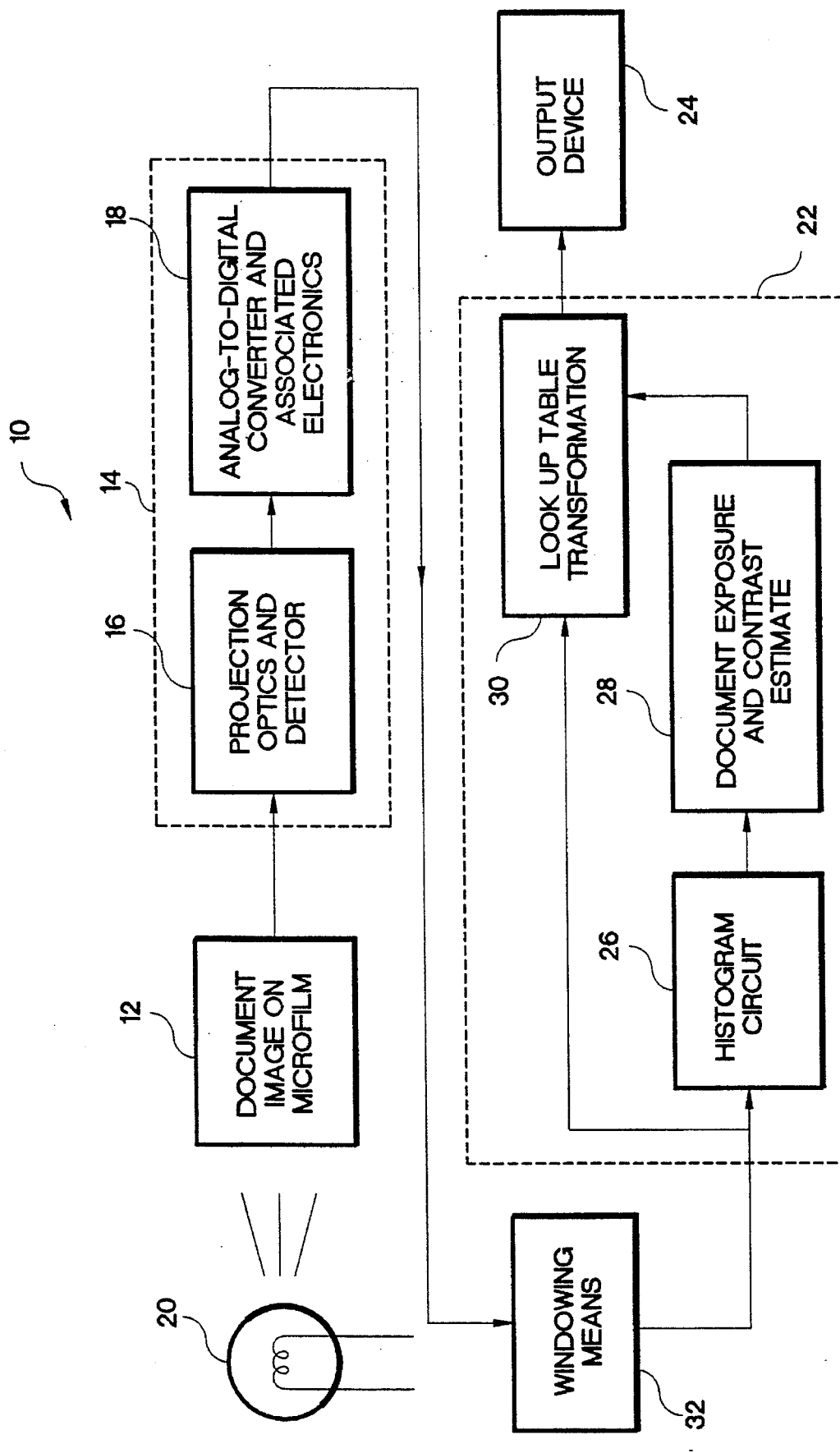
FIG. 1 is a block diagram of the digital image scanner system of the present invention.

The present invention provides for a method of detecting specific characteristics of an image, and making tone corrections by digital image processing to improve the image quality of the output print. An estimate of the contrast and exposure of the film image is made to identify important image information in the film image. The important image information is used to select a look up table for enhancing the useful information and suppressing the less important information.

Referring now to the drawing, FIG. 1 illustrates a block diagram of a digital image scanner system 10 for digitally processing a desired image which is already converted to microfilm, as shown by block 12. A receiving device, such as a viewing screen or a microfilm scanner system 14, locates the desired image on the microfilm, which may be any image including a journal article or other document, in a film gate. The scanner 14 includes a projection optics and detector block 16, for detecting and projecting the microfilm image from block 12, and associated electronics at block 18, including, typically, an analog-to-digital converter. The scanner 14 may be any suitable digital scanner, such as a charge coupled detector (CCD) scanner.

Continuing with FIG. 1, a lamp 20, which may be any suitable light source including a software-controllable lamp, projects the film image from the microfilm of block 12 into the projection optics and detector block 16 as a desired image projection. The optics typically consist of a magnifying lens, a dove prism for image rotation, and a set of mirrors to project the image, although any suitable optics or combination may be used. The light from the lamp 20 shines through the microfilm image represented by block 12 and the scanner 14 then moves the microfilm image past the light to detect the image coming through the film and generate electronic image data in response thereto.

The electronic image data, or image output signal, is processed by a digital image processing and tone correction means 22. The digital image processing and tone correction means 22 generates an output image which is provided to an output device 24, such as a printer, or a CRT or other soft display. The digital image processing and tone correction means 22 includes an optional histogram circuit 26, a document exposure and contrast estimate 28, and a look up table selection capability 30. The digital image processing and tone correction means 22 may further include an optional windowing means 32 for improving image quality of the output image from the digital image processing and tone correction means 22.

The histogram circuit 26 calculates a histogram of pixel values and generates a statistic based on the histogram. The statistic is capable of being scaled by a total number of image pixels, generating a scaled statistic indicative of central tendency of image transformation. The histogram circuit 26, therefore, totals the occurrences of individual signal levels across each microfilm image from block 12. This function is typically performed at pixel clock rates such that no performance or throughput degradation occurs. Software control of this circuit, if desired, can consist of programming the pixel frequency at which samples are taken for the totals. This is generally derived from the image size, in pixels.

The calculated image statistics are used to select the look up table at block 30. Although the image statistics can be calculated indirectly, based on the histogram circuit 26, the histogram circuit can be eliminated from the system 10 and the image statistics can be calculated directly from the actual number of pixel values as they are acquired. This would be a simpler, alternative design, if the histogram circuit 26 is not required in the system 10 for other purposes. The contrast of the processed image from the digital image processing and tone correction means 22 is not modified directly based on the image statistics. Rather, the contrast is changed indirectly by the selection of the previously designed transformation or look up table 30. In this way, the image processing is scene-specific, but constrained to the set of previously designed look up tables. The image quality of the processed images is, therefore, extremely consistent, particularly for documents recorded on an intermediate medium.

The windowing means 32 can be included in the system 10 to mask off unwanted pixel data, or to crop the electronic image data. It can be programmed manually, through user intervention, or automatically from an external document detection circuit. The windowing means 32 may provide an advantage in that it can mask data going to the histogram circuit 26, thereby making the data more representative of the important area of the document or microfilm image from block 12. The windowing means 32 can also improve the image quality of a printed image by masking surrounding areas, outside of the important area.

The important areas of the microfilm image from block 12 are identified by the document exposure and contrast estimate 28. The document exposure and contrast estimate 28 is an estimate of the contrast and exposure of the microfilm image from block 12 and identifies important image information in the image output signal from the scanner 14. The image scanner system 10 is then adjusted, based on the interpretation of the image output signal by the document exposure and contrast estimate 28. The important information identified by the document exposure and contrast estimate 28 is used to select the look up table 30, which can enhance the useful or important information and suppress the less important information, resulting in improved image quality.

The look up table 30 then performs a pixel-by-pixel transformation. The choice of table transformation can be constrained to one of a set of previously determined transformations, which are chosen after consideration of the microfilm polarity, exposure and processing, microfilm image contrast, and output device 24 imaging characteristics. As the image data is acquired from the scanner 14, the histogram circuit 26 calculates the histogram of pixel values. A statistic, s, is then calculated from the histogram, $s=\Phi(p_k)$. Any general function of the probability density function may be used, such as, for example, a simple function given in Equation (1) as, $$s=\Phi(p_k)=a+b\Sigma(p_k), \quad (1)$$

where the summation is from n to m, and m and n are the predetermined limits of signal values over which s is to be calculated. Also, in Equation (1), a and b are values chosen to facilitate the look up table selection, as described below.

The statistic s is now scaled by the total number of image pixels, $N_{total}$, that were included in the summation of Equation (1), to calculate a scaled pixel value, $s_{sc}$, where $$s_{sc}=s/N_{total}. \quad (2)$$

If a=0 and b=1 in Equation (1), then, $$s_{sc}=\Sigma(p_k)/N_{total}, \quad (3)$$

where the summation is again from n to m. Equation (2), then, is the average pixel value calculated for those pixels with values between n and m. If n=0, and m is the maximum pixel value, then $s_{sc}$ becomes the average pixel value. Hence, the scaled statistic $s_{sc}$ can be seen as one indicator of the central tendency of image information. This is then used to select the look up table 30 from the previously determined set. This can be done if each table can be identified by location over the range of pixel values. For document images, this can be done by identifying each table by, for example, its intercept, or its input value corresponding to a specified output value. The chosen look up table 30 is then used as a tone reproduction function for the scanned image data the resulting processed image is now in enhanced form for subsequent output, such as printing, CRT display, or other storage, by the output device 24.

The present invention provides for a digital image scanner system and method, wherein a sample of tone values from the image is used to estimate the exposure or central tendency of the recorded image. The estimate is then used to select a tone correction function used to process the image prior to printing, transmission, or CRT display. By this technique, a scanned image is enhanced, based on its tone value statistics computed from a predetermined range of all possible values. The image statistics can be calculated from a sample histogram, or directly from a sample of actual pixel values as they are acquired.

Having described the invention in detail and by reference to the preferred embodiment thereof, it will be apparent that other modifications and variations are possible without departing from the scope of the invention defined in the appended claims.

What is claimed is:

1. A microfilm retrieval system, comprising:

a) a scanner for scanning a microfilm to produce a digital image;

b) means for forming a statistic $s_{sc}$ representing the central tendency of the digital image;

c) a plurality of predetermined tone reproduction function look up tables;

d) means responsive to the statistic $s_{sc}$ for selecting one of the look up tables; and e) means for performing a pixel by pixel transformation of the digital image using the selected look up table.

2. The microfilm retrieval system claimed in claim 1, further comprising: windowing means for cropping the digital image prior to forming the statistic $s_{sc}$.

* * * * *